United States Patent [19]

De Prijcker et al.

[11] Patent Number: 5,017,951

[45] Date of Patent: May 21, 1991

[54] PHOTOGRAPHIC PROCESSING APPLICATION WITH REPLACEABLE CASSETTE

[75] Inventors: Jozef P. De Prijcker, Hamme; Jan A. Zwijsen, Wilrijk; Albrecht F. Domen, Bornem; Gino L. De Rycke, Mortsel, all of Belgium

[73] Assignee: Agfa-Gevaert, N.V., Mortsel, Belgium

[21] Appl. No.: 521,886

Related U.S. Application Data

[62] Division of Ser. No. 333,020, Apr. 4, 1989, Pat. No. 4,967,221.

[22] Filed: Apr. 10, 1990

[51] Int. Cl.$^5$ .............................................. G03B 27/52

[52] U.S. Cl. ...................................... 355/27; 354/318; 354/324

[58] Field of Search ............... 354/318, 323, 324, 333, 354/336; 355/27, 28; 222/81, 82, 83, 83.5, 85, 86

[56] References Cited

U.S. PATENT DOCUMENTS 4,103,358 7/1978 Gacki et al. ......................... 354/323
4,334,252 1/1987 Jeremijevic ......................... 354/324
4,566,772 1/1986 Sulesky et al. ...................... 354/318
4,814,093 3/1989 Prijcker et al. ...................... 354/324

FOREIGN PATENT DOCUMENTS 0271610 6/1988 European Pat. Off. .

*Primary Examiner*—A. A. Mathews
*Attorney, Agent, or Firm*—William J. Daniel

[57] ABSTRACT

Photographic image-forming apparatus with replaceable cassette which comprises an exposure station for the imagewise exposure of a photographic silver halide emulsion layer element, a developing station wherein a silver halide developer liquid is applied to said imagewise exposed element, and a fixing station wherein a silver halide fixing agent is applied to the imagewise exposed element, and driving means for transporting the element through the stations, wherein at least the developing station (36) is incorporated into a processing cassette (35, 91) that contains developing liquid and removably fits into said apparatus, said cassette houses absorption means (40) effective for absorbing unused developer liquid brought into contact therewith, and the apparatus comprises means (78, 79, 80) operable in association with the processing cassette for bringing unused developer liquid in the cassette into contact with said absorption means when the cassette is removed from the apparatus.

6 Claims, 8 Drawing Sheets

PHOTOGRAPHIC PROCESSING APPLICATION WITH REPLACEABLE CASSETTE

This application is a division of application Ser. No. 07/333,020, filed Apr. 4, 1989, now U.S. Pat. No. 4,967,221.

BACKGROUND OF THE INVENTION

1. Field of the invention

The present invention relates to a photographic processing cassette for the processing of an image-wise exposed photographic silver halide emulsion layer element and to a photographic image-forming apparatus for the convenient processing of photographic film sheets, incorporating such processing cassette such as a microfilm camera or a COM (computer output microfiche) device for the production of microfiches, a phototypesetter, etc.

2. Description of the related art

Micro-images are commonly photographically processed according to one of the following two processes.

The first process is a "dry processing" silver halide system, wherein an image is generated by exposure and thermal development of a light-sensitive layer containing minor amounts of light-sensitive silver halide, an organic silver soap and a reducer. This system has the important advantage of dry processing (no liquids), but it has been shown that the storage conditions of the processed film are critical, and that the processing is temperature-dependent, resulting in variations in the gradation and the maximum density of the film. A further disadvantage is the low storage life of these images.

The second process is the classic silver halide process that yields very satisfactory images, but that is hampered by the use of a developer liquid requiring controlled regeneration in view of aerial oxidation, and the resultant inconvenience, in particular for the low-end user who makes approximately 5 to 50 microfiches per week.

It is known in other areas of photographic reproduction, for instance in graphic line and screen-work, to use light-sensitive silver halide emulsion material that incorporates its own developing agents which become active by contact with an alkaline activation solution. In this process, there is no premature oxidation of the developing agents by exposure of the developing liquid to the air as in conventional silver-halide photogrphay, whereby the processing liquid regeneration becomes simpler.

The convenience of photographic processing is further improved if the processing solutions are supplied to the different processing stations by means of holders of a reduced volume, e.g. 1 liter bottles, that are placed in inverted position on the apparatus and the contents of which is supplied to processing stations by means of a so called chicken-feed level control system.

Activation-type photographic processing apparatus of this kind can be left in stand-by condition for periods ranging from days to weeks, and yet they are capable of producing good processing results after a few seconds of running-in.

In spite of the mentioned advantages, the described inverted bottle-type processing apparatus disadvantages which make their use less convenient than is desirable.

One disadvantage is the need for a particular valve that is required for the bottles containing processing liquid, and that will be only opened at the moment the inverted bottle reaches its operative position in the apparatus.

Another disadvantage is that the holder for rinsing water must be overproportionally large, since the rinsing water becomes loaded with substances that are dissolved and leached out by the fixing of the developed photographic silver halide element. The concentration of such substances in the rinsing liquid may not exceed a given level otherwise the rinsing becomes insufficient. The latter problem may be overcome by the connection of the apparatus to a tap water supply, but this measure considerably reduces the convenience of use of the apparatus.

Finally, the different processing stations must be provided with liquid discharge means in order to empty such stations prior to their removal from the apparatus for cleaning purposes or servicing. In the case of processing sections in the form of shallow trays that are not emptied while in the apparatus, the operator must carefully remove each such tray from the apparatus and bring it to a sink for pouring away the liquid.

There is disclosed an improved photographic apparatus and method for the processing of an image-wise exposed photographic silver halide emulsion layer element in EU patent publication A1 0 271 610 entitled: "Photographic processing apparatus and method". According to this application, the holders for the different processing liquids are in the form of one common processing cassette, thereby to avoid the difficulties related with the use of different processing bottles. However the processing cassette according to this application still contains residual quantities of processing liquid when the cassette is removed by the operator from the apparatus, for instance when the useful lifetime of the cassette in the apparatus is ended, or when a pre-determined number of microfilms has been processed. In processing liquid remaining in the cassette constitute a risk for the operator or for his environment if the cassette is not handled with care.

It is the object of the present invention to provide a photographic processing cassette and an apparatus of the kind referred to, which further increase the convenience of use in operation.

SUMMARY OF THE INVENTION

In accordance with the present invention, a photographic processing cassette for the processing of a photographic silver halide emulsion layer element that has been imagewise exposed in a photographic image-forming apparatus, comprises a developer tray arranged for co-operation with lick roller means for the application of developer liquid to the photographic element, a holder for developing liquid, and rupturable wall means through which a fluid connection between the holder and the tray can be established, a rupturable draining area in the developer liquid circuit, and liquid absorption means located beneath said rupturable draining area.

The inventive processing cassette has the advantage that as the cassette is removed from the image-forming apparatus, it does not contain any longer a free body of a developer liquid. The removed cassette thus may be inverted, it may be thrown in a dust-bin, without any risk for developer liquid to leak away and to soil cloths, floor covering, etc.

The photographic processing cassette according to the present invention is particularly suited for use in a method for rapid and ecologically clean processing of a photographic silver halide emulsion element as disclosed in EU Patent Publication 0 221 599. In accordance with this application a method for processing an exposed photographic silver halide emulsion material comprises the steps of (A) developing an image-wise exposed silver halide emulsion layer by means of (a) developing agent(s) using an aqueous alkaline liquid, (B) bringing the developed photographic material while being still wet with the liquid used in step (A) with its silver halide emulsion layer side into intimate contact with a water-absorbing layer of a receptor element, that contains in an organic hydrophilic colloid binder a silver halide complexing agent, also called silver halide solvent, and in dispersed form a metal sulphide as silver-ion scavenging agent, (C) maintaining said photographic material and receptor element in contact with each other to allow the transfer of dissolved complexed silver compound into said receptor element till removal of undeveloped silver halide from the exposed silver halide emulsion layer is substantially completed and resulted in the formation of a silver sulphide precipitate in the receptor element, and (D) separating the photographic material from the receptor element, and wherein said water-absorbing layer contains said metal sulphide in colloidal form with an average grain size below 0.1 $\mu$m, and contains said metal sulphide at a sulphide ion coverage per sq.m at least stoichiometrically equivalent with the silver ion coverage per sq.m in the photographic material in unexposed and undeveloped state, the molar coverage per $m^2$ of said complexing agent being not lower than 1/20th of the molar coverage per $m^2$ of silver halide in the photograph material to be processed.

Suitable embodiments of the photographic processing cassette according to the invention are as follows.

The rupturable draining area in the liquid circuit of the processing cassette is formed by a weakened wall section of the developing tray. This measure may be obtained in a most simple way by providing a small wall section, e.g. one having a circular shape with the size of a small coin, with a circumference of reduced wall thickness so that a small force suffices for breaking such wall section away, draining thereby the developing circuit. Preferably, said weakened wall section has exterior lever means for co-operation with detent means of the photographic imaging apparatus in which said processing cassette is used, said co-operation being such that said lever means may pass unhindered as the cassette is introduced into the apparatus but becomes retained and thereby breaks the weakened wall section upon the withdrawal of the cassette from the apparatus.

The developing tray may be arranged for co-operation with a hood means for covering the open topside of the tray. Such hood means may be in the form of a removable top closure for springlocking engagement with the tray and for engagement by lifting means to withdraw the closure from and to replace it onto said tray. In this way, lick roller means in the tray may remain well protected during transport and handling of the processing cassette. As the cassette has been introducd into the photographic imaging apparatus, the closure may be temporarily removed thereby to expose the lick roller means for contact with the film sheet to be processed, but after the processing the closure is replaced on the tray to prevent the developer liquid from premature deterioration.

According to one embodiment of the inventive cassette the lick roller constitutes part of the processing cassette itself. In such case, the lick roller means may be made exclusively of plastics components.

According to another embodiment of the inventive cassette, the lick roller means is part of the photographic image apparatus, and co-operates with the tray of the cassette as the cassette is introduced in the apparatus. In this way, the lick roller may be made from metal or the like, and its journalling and its finishing may receive more attention than in the case of a roller that is provided in a disposable cassette.

The present invention includes also apparatus for image formation.

In accordance with the latter aspect of the invention, a photographic image-forming apparatus which comprises an exposure station for the imagewise exposure of a photographic silver halide emulsion layer element, a developing station in which a silver halide developer liquid, and a fixing station in which a silver halide fixing agent is applied to the imagewise exposed element as it is moved through such stations, and drive means for transporting said element through the stations is characterized is that at least the developing station is incorporated into a separate processing cassette that removably fits into said apparatus, that said cassette contains absorption means for absorbing unused developing liquid, and that the apparatus comprises means co-operating with the processing cassette for causing the absorption of developing liquid by said absorption means to take place as the cassette is removed from the apparatus.

Further according to this aspect of the invention, a photographic image-forming apparatus which comprises an exposure station for the imagewise exposure of a photographic silver halide emulsion layer element, and a processing station for the photographic processing of said element, and which is arranged for co-operation with a cassette which contains at least a photographic developer liquid, is characterized in that the cassette has a holder for developer liquid and a tray arranged for co-operation with a lick roller applicator, and that said apparatus has a lick roller which is rotatably journalled at one end only, the opposite, free end of the lick roller being arranged for causing the establishing of a fluid connection between the holder and the tray as the cassette is introduced into the apparatus.

According to a suitable embodiment of this apparatus, the free end of the lick roller has a tapered form for rupturing a wall zone of reduced strength of the cassette, separating the holder and the tray.

According to a further suitable embodiment of an apparatus according to the invention, there is provided spindle means for the unwinding and in roll form winding of a receptor web to be brought into contact with a developed element, said spindle means being arranged for at least partial withdrawal from the apparatus in order to facilitate the removal of a used and the introduction of a fresh roll of such web into the apparatus.

The apparatus may be arranged for the exposure of documents onto microfiches, and in such case it preferably comprises dispensing means for dispensing microfiches from a supply thereof to said exposure station.

BRIEF DESCRIPTION OF THE DRAWINGS

The invention will be described hereinafter by way of example with reference to the accompanying drawings wherein.

Figure 1:
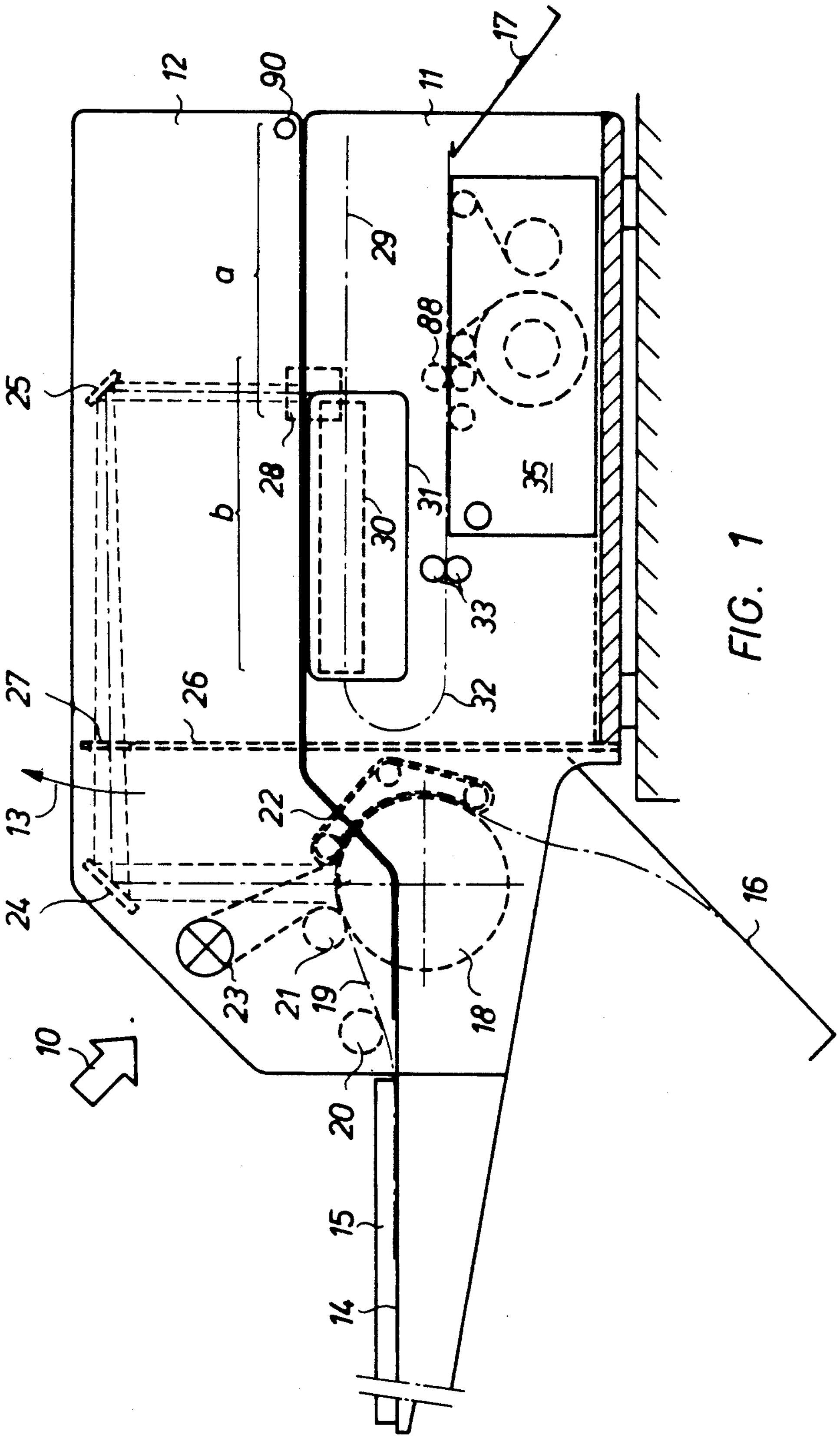
FIG. 1 is a diagrammatic longitudinal sectional view of one embodiment of a photographic image-forming apparatus according to the present invention.

The photographic image-forming apparatus illustrated in FIG. 1, is located in a housing represented generally by the arrow 10, with a bottom part 11 and a top part 12 that is hinged to the bottom at 90 and that may be swung open in the direction of the arrow 13.

The apparatus has at the front side a table 14 with laterally adjustable guides such as 15, onto which the document which must be microfilmed may be positioned and forwarded into the apparatus, and a tray 16 into which the document is returned after the imagewise exposure. At the rearside, there is a tray 17 into which an exposed and processed microfilm sheet is received.

The exposure section of the apparatus comprises the following elements. A driven drum 18 around which the original document is passed along a path 19 which is determined by rollers 20 and 21, and an endless belt 22, an elongated light source 23 for illuminating a transverse section of the document, and an optical reproduction system comprising mirrors 24 and 25, a vertical partition 26 with a horizontal slot 27, and a lens unit 28. The lens unit is arranged for reproduction of a reduced image of the original on a standardized scale such as 1:24, and is mounted on a carriage so that it can take a plurality of laterally spaced positions, corresponding with the number of rows of micro-images on the film sheet. During the passage of the original through the exposure station, there occurs a relative longitudinal displacement between the lens unit and the film sheet on a correspondingly reduced scale, so that in this way the document becomes progressively exposed on the film sheet as it moves through the exposure plane.

As one exposure has been made, the lens unit is stepwise moved to the next lateral position and so on, until one complete row of images has been exposed on the film. Then the film sheet is shifted in the longitudinal direction over a distance corresponding with the width of one row, so that a next row may be stepwise exposed, and so on.

The position of a film sheet in the image plane 29 is indicated by the bracket a for the exposure of the first row of images, and by the bracket b for the last row of images on the film sheet. The stepwise transport of the film sheet may occur by any means known in the art, under the control of the exposure station, and makes no part of this invention.

The film sheet to be exposed may be introduced as a single sheet in the apparatus by means of an appropriate holder, but preferably the apparatus comprises a stack of unexposed film sheets, e.g. 100 sheets, and dispensing means for automatically feeding said sheets one by one into the image plane 29, each sheet being suited for a standardized number of distinct imagewise exposures, for instance 15×6 images on a scale 1:24.

A stack of 100 sheets has been diagrammatically indicated in broken line in the Figure by the rectangle 30, and this stack may be introduced in the apparatus by means of a suitable light-tight holder, through an opening in a lateral wall of the apparatus, to be light-tightly closed by means of a door 31.

It should be understood that the image plane 29 is located approximately centrally of the apparatus, whereas the stack 30 of microfilm sheets is positioned at one lateral side of this plane. Appropriate dispensing means is arranged for removing each time one film sheet from the stack of film sheets, and transporting it laterally into the image plane 29 represented by a dot-dash line.

As the imagewise exposure of a film sheet is finished, i.e. when the film sheet has been completely exposed, or when the film sheet has only partially been exposed to all the documents belonging to one group, the film sheet is transported along the path 32 and fed by a roller pair 33 over the top of a photographic processing cassette 35 which removably fits as one unit into the apparatus.

Figure 2:
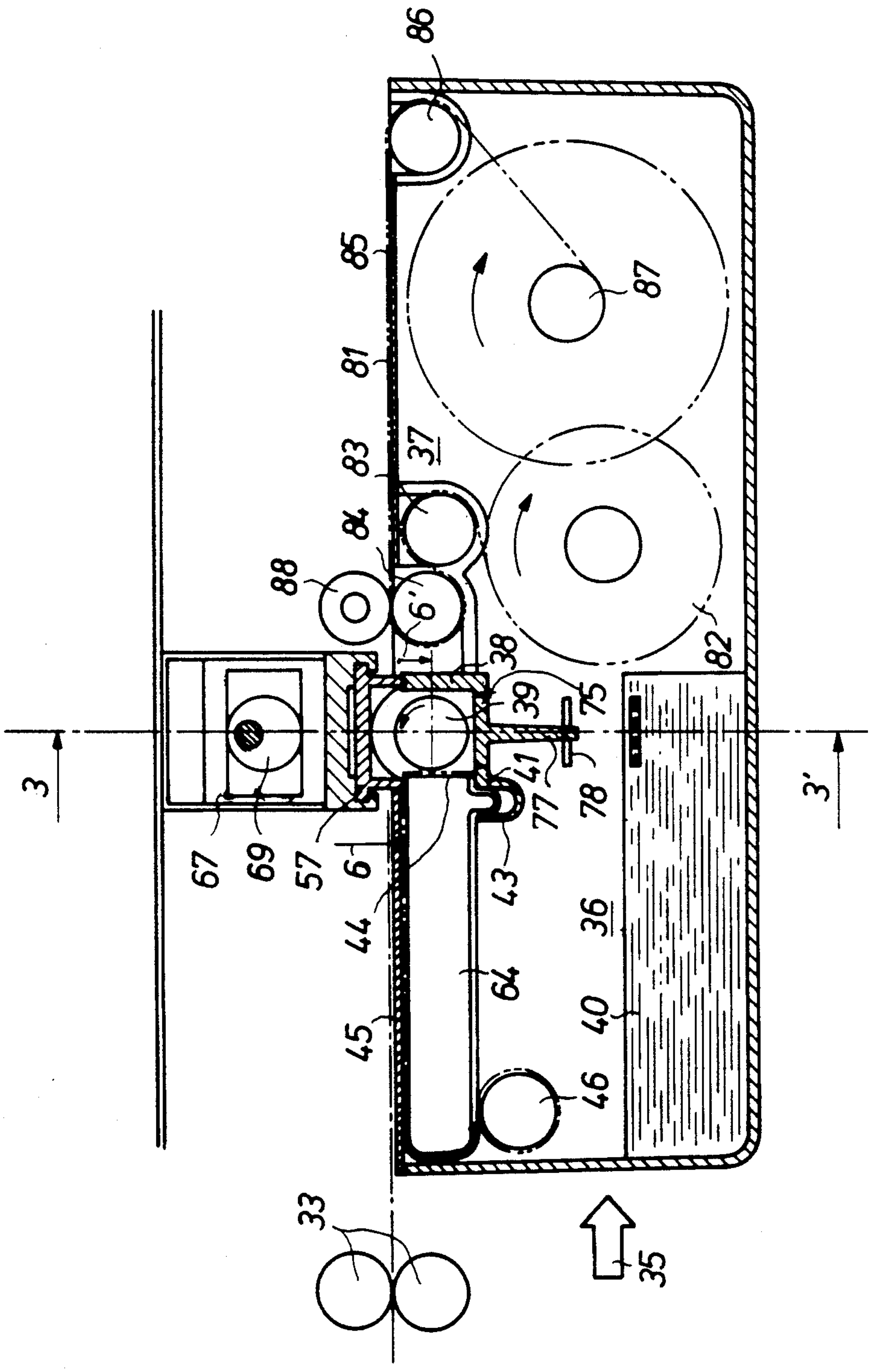
FIG. 2 is a diagrammatic longitudinal sectional view on an enlarged scale of one embodiment of a photographic processing cassette as used in the apparatus of FIG. 1.

The processing cassette 35 as well as some co-operating parts in the apparatus, are illustrated in detail in FIG. 2.

The processing cassette is in the present example a generally rectangular container of the disposable type, which has at the left-hand side, according to the Figure, a developing section 36 and at the right-hand side a fixing section 37.

The developing section 36 comprises a holder 64 with developing liquid a developing tray 38 with a lick roller 39, and an absorbent pack 40.

Figure 6:
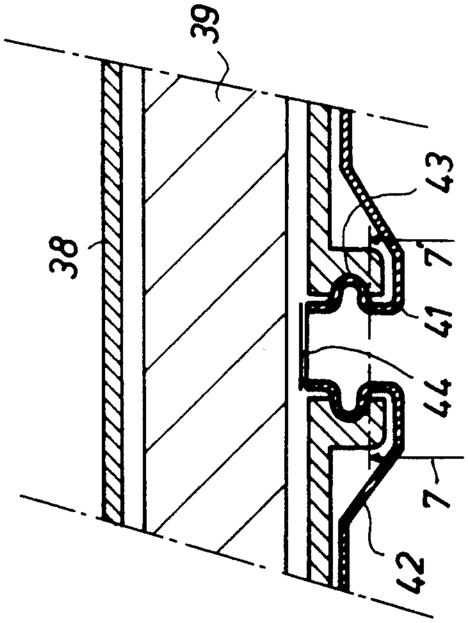
FIG. 6 is a cross-sectional view on line 6-6' of FIG. 2.
Figure 7:
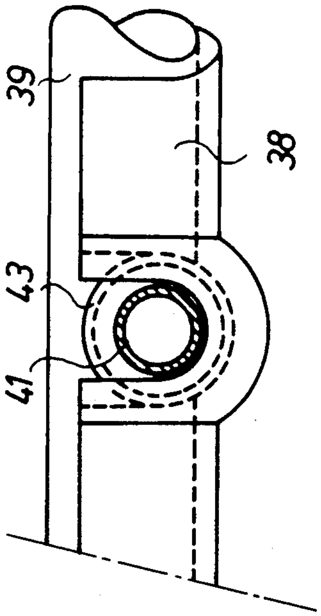
FIG. 7 is a cross-sectional view on line 7-7' of FIG. 6.

The holder 64 may have many forms, but a suitable form is the one illustrated in FIG. 2, which is a flat rectangular container, made from a suitable plastic such as high-density polyethylene and which is provided with a cylindrical neck portion 41 which is recessed somewhat in the innermost wall 42 of the container, and which has a circular bead 43 see FIG. 6. The opening of the neck is preferably sealed (e.g. induction-sealed) by a foil 44, which has been drawn in a separate position in FIG. 6 for the sake of clarity, and which has an outwardly folded extension 45, see the illustration by a dash and double-dot line FIG. 2, which runs over the top wall of the container and along its outer (left end) and is connected to a winding spindle 46.

The developer tray 38 is a gutter-like member closed by end walls 47 and 49, with a square cross-section, that extends transversely of the cassette, and into which a lick roller 39 is rotatably journalled. The lick roller extends at one end through end wall 47 of the tray 38 and is fluid-tightly sealed by a resilient O-ring 48 (see FIG. 3). At the opposite end, the lick roller is journalled in a corresponding bore at the innerside of the tray end wall 49. It is thus clear that the rotational journalling of the lick roller results from the direct journalling of the mantle of the roller itself, and in this way a most inexpensive roller journalling has been obtained. Moreover, the roller can be made completely from plastics, whereby consequently the absence of any metal part, creates the possibility of making the complete cassette readily disposable. The protruding end of the roller has a slot or like arrangement for entering in driving engagement with driving means in the apparatus.

Figure 5:
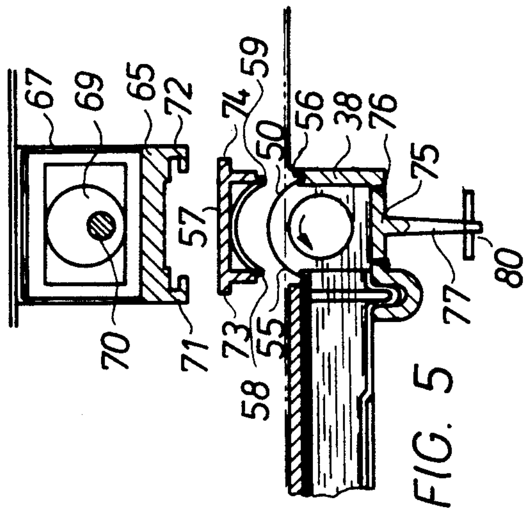
FIG. 5 is a cross-sectional view on line 5-5' of FIG. 3.
Figure 4:
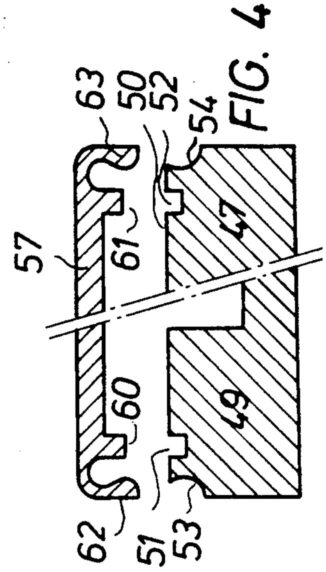
FIG. 4 is a sectional enlargement of FIG. 3.
Figure 3:
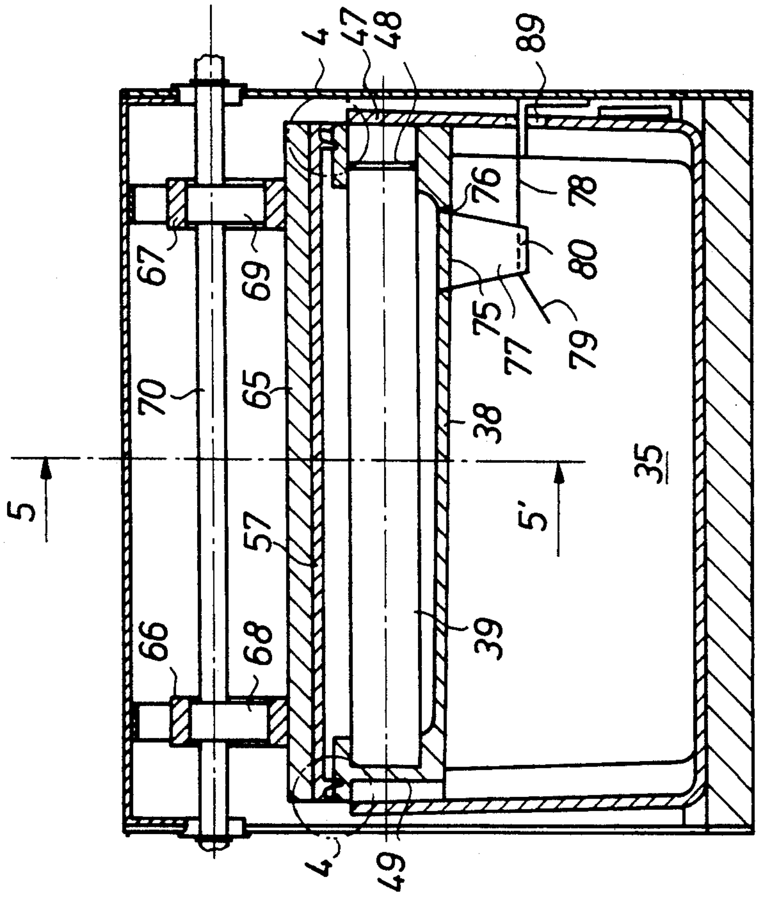
FIG. 3 is a cross-sectional view on line 3-3' of FIG. 2.

The outside end walls 47 and 49 of the tray, see also the enlarged representation in FIG. 4 of the portions encircled by the circles 4 in FIG. 3, have curved top ends, as illustrated in FIG. 5 for the top end 50, which have grooves 51, 52 and undercut recesses 53, 54. The internal longitudinal walls of the tray have grooves 55 and 56, see FIG. 5, which merge into the end grooves 51 and 52, thereby forming an upwardly opening channel, around the periphery of the tray.

The open top of the tray may be closed by means of a removable top closure or cap 57 which has straight longitudinal lips 58 and 59, and curved end lips 60 and 61, which closely engage the corresponding peripheral grooves 55, 56 and 51, 52 on top of the tray. The closure 57 also has beaded rims 62 and 63 at both its ends that run concentric with the undercut recesses 53 and 54 and that resiliently but yet firmly fit into the undercut recesses. The described construction permits a tight clamping of the closure on the tray, whereby the lick roller is protected from damage or soiling prior to its first use, and whereby the tray may also be kept closed after each use and opened only when a film sheet must be processed.

The closure may be removed from the tray by a mechanical arrangement as illustrated in FIG. 5. For the sake of clarity the closure has been drawn as separated from the arrangement, but in use there is an engagement of both members as shown in FIG. 2. The arrangement comprises a beam 65 which is supported by two cam followers 66 and 67 (See FIG. 3) that have a rectangular inner opening into which fit cams 68 and 69, that in turn slidably fit in guides, not illustrated, that permit vertical displacements only of said supports. The cams are fitted on a shaft 70, which may be rotated by suitable means in the apparatus.

The beam has on its underside two parallel elongated grooves 71, 72 into which slidingly fit two protruding flanges 73, 74 along the longitudinal edges of the closure 57. The ridges 73 and 74 extend over the full length of the cap, and thereby they provide a firm engagement of the cap with the beam 65. The engagement of the flanges of the cap with the beam grooves occurs as the cassette is laterally introduced into the apparatus.

The bottom wall of the tray 38 is provided with a rupturable wall section 75 with a circular shape with the size of a coin, see FIG. 3. The section 75 is made rupturable by the provision of a circular peripheral groove 76 of reduced wall thickness in the bottom wall of the tray. The rupturable section 75 is provided with an exterior torque 77, preferably integrally moulded therewith, which has a fin-like shape as illustrated, and serves as a lever for applying rupturing force to wall section 75. The fin 77 co-operates with detent means in the form of a nearly horizontal plausible steel leaf 78 with a downwardly angled extremity 79 and an elongated aperture 80 the lever end of recurring tongue 77. The leaf is at its outside end fixed to the innerside of a corresponding wall of the apparatus and projects through an opening 89 in the side of the cassette into its interior below bottom wall 38.

The processing cassette comprises in the fixing section 37 a receptor web 81 illustrated in a dash and double-dotted line in FIG. 2. That is unwound from a freely rotatable roll 82, and that is conveyed about rollers 83 and 84 over the top wall 85 of the cassette and via an idler roller 86, towards a winding spindle 87. The reason why the diameter of a roll of receptor web collected on spindle 87 has been drawn much larger than that of the (full) unwinding roll 82, is that the receptor web absorb moisture from developed film sheets, and gets thereby an increased thickness. The roller 84 and the spindle 87 are shaped in a way, similar to the lick roller 39, for making driving engagement with driving shafts of the apparatus.

Further the apparatus comprises a driven pressure roller 88 that is arranged for entering into contact with the roller 84 thereby to form a pressure roller pair for urging a developed film sheet in firm contact with the receptor web, and for driving the sheet and the web at a controlled speed along the top wall 85 in order to let the diffusion transfer of the complexed silver halide in the receptor web for precipitation there take place.

The apparatus comprises finally motor means for driving the several rollers of the apparatus, microswitches for sensing the position of a film sheet at a given location, for presence of a cassette in the apparatus, for the removal of the closure cap from the developer tray, etc., and for controlling in response thereto the operation of the apparatus. All suchlike means are known in the art, and therefore no further details are given thereof. The description hereinafter of the operation of the apparatus, is therefore concerned only with the functional aspects of the apparatus.

OPERATION OF THE APPARATUS

The operator opens a loading pack which comprises the following consumables for the apparatus, namely a stack of unexposed film sheets. e.g. 100 standard type microfilm sheets measuring 105×148 mm, and a fresh processing cassette with processing ingredients of a type for performing the method for processing an exposed photographic silver halide emulsion material as disclosed in EU Application No 0 221 599 mentioned hereinbefore.

The operator introduces the stack of microfilm sheets into the apparatus under circumstances presenting any exposure of the film sheets. In a preferred form, the microfilm sheets are contained in an appropriate light-tight flat holder, which becomes automatically opened in the apparatus after the lid 31 has been closed. This holder for the daylight loading of the film sheets may have many forms, and makes in fact no part of the present invention.

The operator then introduces the processing cassette 35 into the apparatus through an opening in one side wall of housing section 11, e.g., the left side in FIG. 3 which can be closed by a closure panel not shown. The lateral insertion of the cassette causes the winding spindles 46 and 87, and the rollers 39 and 84 to enter into driving engagement with corresponding driving shafts provided in the apparatus. Also, the fin 77 slides over the angled portion 79 of the leaf 78 and flexes the leaf downwardly until finally the fin enters into and becomes engaged by the slot 80.

Then the apparatus is started whereby the following operations occur in sequence.

One film sheet is removed from the stack of film sheets, and is transferred to the exposure plane at the position indicated by the bracket a in FIG. 1.

The spindle 46 is rotated whereby the sealing foil 44 is pulled from the opening 41 of the neck of the container and becomes, via the extension 45, wound on the spindle 46. After the opening operation, the rotation of the spindle 46 may be arrested, but the spindle may also continue to rotate.

Then, a document that must be microfilmed is put on the table 14, and aligned by the guide 15. The document is forwarded until it is gripped by the rollers 20 and 21, and the endless belt 22 which conduct the document about the drum 18 and cause its scanning exposure on an appropriately reduced scale on a given sub-area of the film sheet in the image plane 29. Next other documents are exposed in sequence, in row and columns, until the complete film sheet has been exposed, or until a group of documents have been exposed which covers a portion only of the available space on the film sheet.

For the development of the exposed film sheet, the sheet is conveyed along the path 32 by appropriate rollers, towards the roller pair 33. As the sheet arrives at the roller pair 33, the cap 57 has already been lifted from the tray 38, and the lick roller 39 has been made to rotate in the direction indicated by the arrow. The level of the developer liquid in the tray falls as liquid is being consumed by successive sheets, but since the roller 39 reaches almost to the bottom of the tray, and since the actual development occurs by the bead of liquid produced in the nip between the top of the roller and the film sheet passing in tangential contact therewith, it will be understood that uniform development results will be obtained from the first up to the last sheet.

As the film sheet enters the nip of the rollers 84 and 88, see FIG. 2, it is contacting with its lower surface the receptor web 81. This contact progresses until the film sheet is over its complete length in contact with the receptor sheet. During this contact, dissolved complexed silver compound is transferred to the receptor web until removal of undeveloped silver halide from the exposed silver halide emulsion layer of the film is substantially completed and resulted in the formation of a silver sulphide precipitate in the receptor web.

As the trailing edge of the film sheet is released from the roller pair 33, the further film sheet transport is taken over by the pressure roller pair 84, 88 and also by the adhesion of the film sheet to the web 81, which is kept under tension by the spindle 87 which is driven through the intermediary of a slip clutch.

As the leading edge of the film sheet passes over the roller 86, the film sheet continues on its straight path due to its stiffness, whereas the receptor web 81 is progressively peeled from the film and wound up on the spindle 87.

If the transfer of complexed silver compound from the film sheet into the receptor web proceeds too slowly for the distance that is available between the rollers 84 and 86, and at the transport speed of the materials, there may be provided a heating in the transfer zone, e.g. by means of IR-heaters irradiating a portion or the complete area of the top wall 85, or by means of a current of heated air.

As soon as the film sheet leaves contact with the rollers 84,88 the rotation of the lick roller 39 may be arrested and the cap 57 be closed in order to prevent premature deterioration of the developer liquid by contact with the environmental air.

The film sheet leaving the apparatus is at least almost dry, and provides without further treatments a document with excellent archieval properties.

When 100 film sheets has been consumed, which points to almost complete consumption of developer liquid, or as the recommended lifetime of the developer liquid expires, the operator must replace the cassette by a fresh one.

Withdrawal of the used cassette from the apparatus automatically causes the rupturing of the wall section 75 of the tray by the retaining of the fin 77 so that the remaining liquid rapidly flows into the space below the tray and is there instantly absorbed by the absorbant material 40. The broken wall section and the fin remain within the cassette since the size of the slotlike opening 89 in the side wall of the cassette is just sufficiently large to enable the passage of the leaf 78 with its angled portion 79. Preferably, repeatable wall section 75 is located adjacent the sidewall with opening 89 to allow maximum opportunity for the emptied unconsumed processing liquid to be absorbed by material 40 before the cassette completely leaves the apparatus.

The withdrawn cassette may be reversed since it contains no longer a free body of liquid. Soiling of the hands of the operator by the wet tray and lickroller is impossible since the closure 57 is in place on the tray, and the resilient clamping by the co-operating beaded edges 62, 63 and the corresponding recesses 53, 54 is sufficiently tight to resist the inadvertant removal of the closure from the cassette. Finally, the receptor web has been completely wound into the cassette prior to the removal of the cassette, so that the unused trailing end of the web performed some cleaning action of the top wall 85.

A second embodiment of a processing cassette in accordance with the present invention is described hereinafter with reference to FIGS. 8 to 12.

Figure 8:
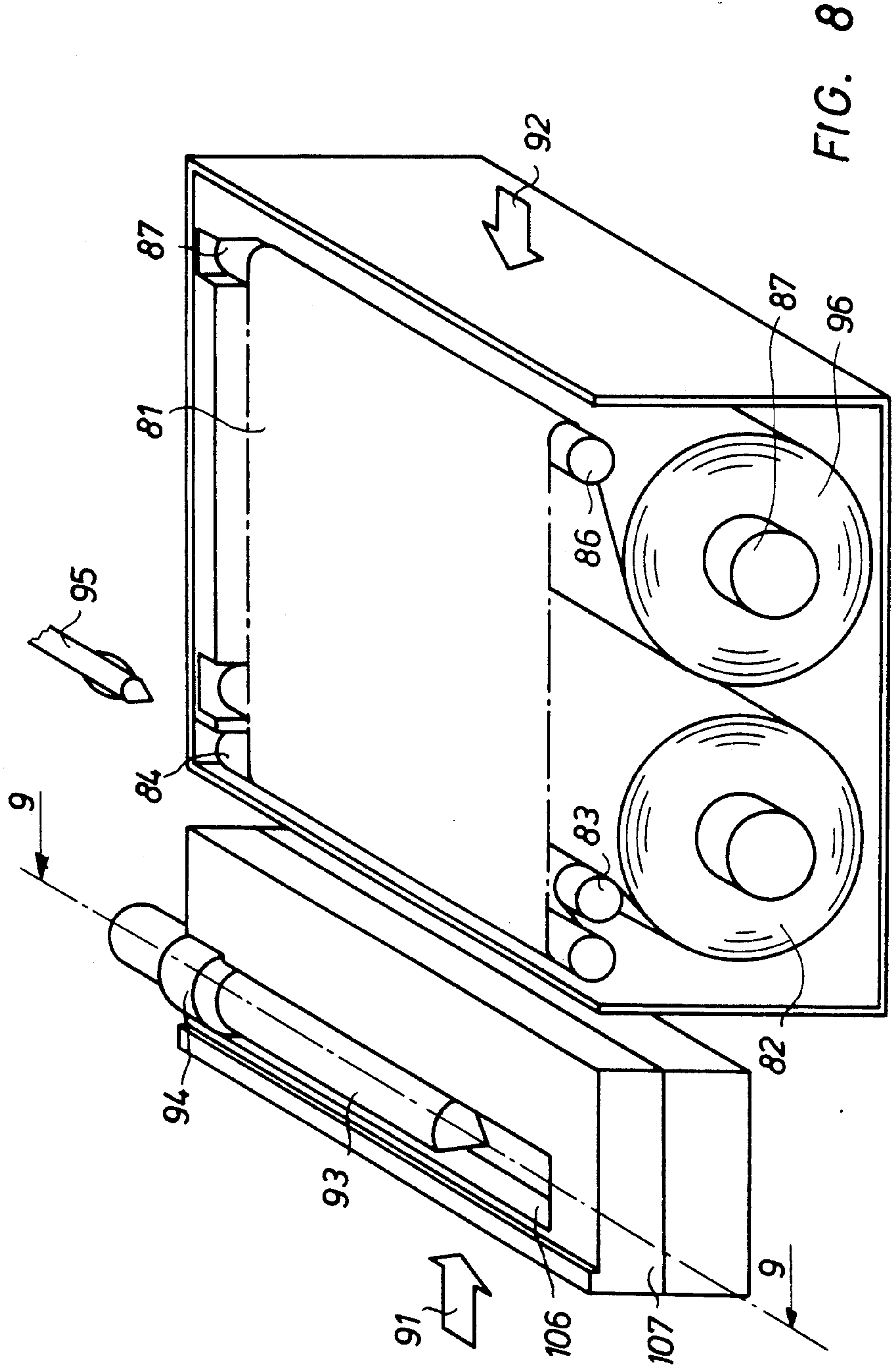
FIG. 8 is a three-dimension illustration of a second embodiment of a processing cassette according to the invention.
Figure 11:
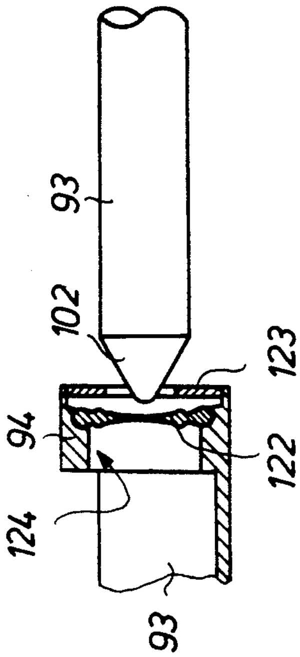
FIG. 11 is a detail view of the seal between the cassette and the lick roller.

Referring to FIG. 8, there are illustrated a developing cassette 91 according to the invention, and a separate fixing cassette 92.

The developing cassette 91 is arranged for co-operation with a separate lick roller 93 which is part of a photographic imaging apparatus but which is basically the same as the developing tray hereinbefore with reference to FIG. 1, whereas the fixing cassette 92 corresponds with the right-hand section 37 of the cassette 35 shown in FIG. 2. The cassettes 91 and 92 are illustrated in a position that corresponds approximately with a 80%'s insertion in the photographic imaging apparatus. That is to say, the developing cassette 91 should be moved some more centimeters to the rear in FIG. 8 away from the viewer in order for it to reach with its end seal 94 the innerside end of the lick roller 93, whereas the fixing cassette 92 should likewise be displaced over such distance in order that it would engage with its roller 84 a driving shaft 95 of the photographic imaging apparatus. The fixing cassette may have internal gear means for transmitting the rotation of the roller 84 to a slip clutch, not illustrated, on the spindle 87 for winding the used web. The fixing cassette may be arranged for easy removal of the roll 96 of used receptor web 81 from the cassette, prior to the disposal of the cassette.

In this way, it may be easier to meet under certain circumstances determined ecological requirements concerning the disposal of waste material, since the used roll may be separately wrapped and disposed off. Also, one may wish to recover valuable material e.g., silver compounds from such roll.

The developing cassette 91 is described hereinafter with reference to FIG. 9 which is a longitudinal vertical sectional view on line 9–9' of FIG. 8, with the cassette in fully inserted operative position, and FIG. 10 which is a cross-sectional view on line 10—10 of FIG. 9.

The lickroller 93 is journalled in the apparatus by means of two roller bearings 97 and 98 in a bearing housing 99 that is fitted to a wall 100 of the apparatus. The shaft end 101 of the lick roller is connected to a motor for the rotation thereof.

The freely extending lick roller has a pointed extremity 102 that is capable of destroying a wall section 103 of the processing cassette 91 as the cassette is inserted in the apparatus through an inlet opening 104 of the wall 105.

The processing cassette 91 is a generally rectangular container with a lickroller tray 106 an upper space 107 which contains a supply of developer liquid, and a lower space 108 wherein liquid absorbing means is provided. The container is preferably made from plastic by injection moulding, and is constituted from several parts that may be assembled by glueing, ultrasonic welding, etc.

The upper space 107 has an opening through which said space may be filled with developer liquid by the manufacturer of the cassettes and which then is permanently liquid-tight sealed by means of a plug 109, e.g. by ultrasonic welding.

Figure 9:
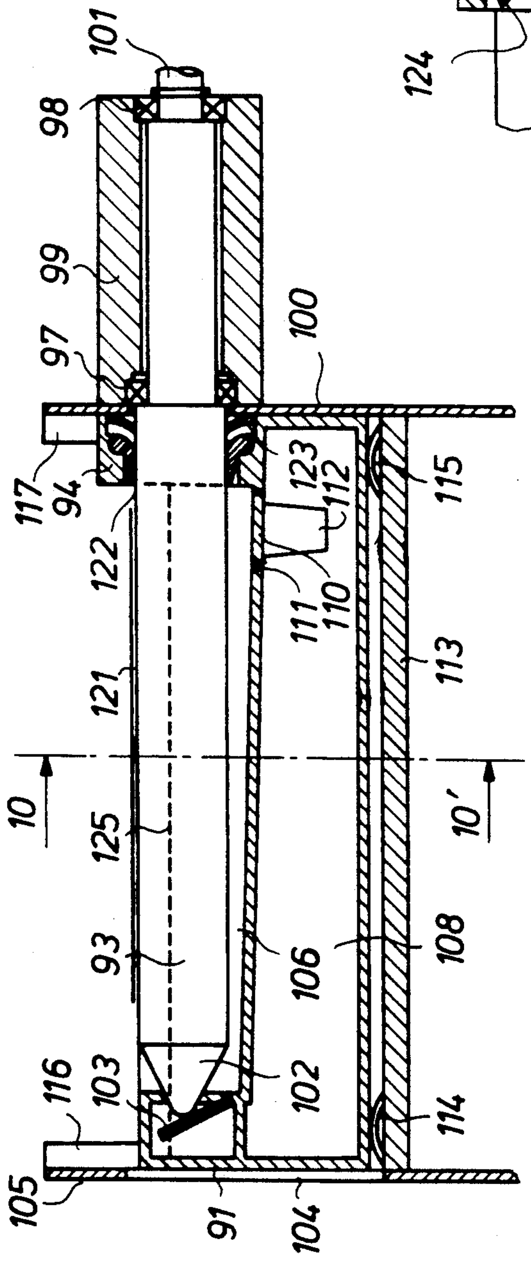
FIG. 9 is a longitudinal sectional view on line 9—9' of FIG. 8.
Figure 10:
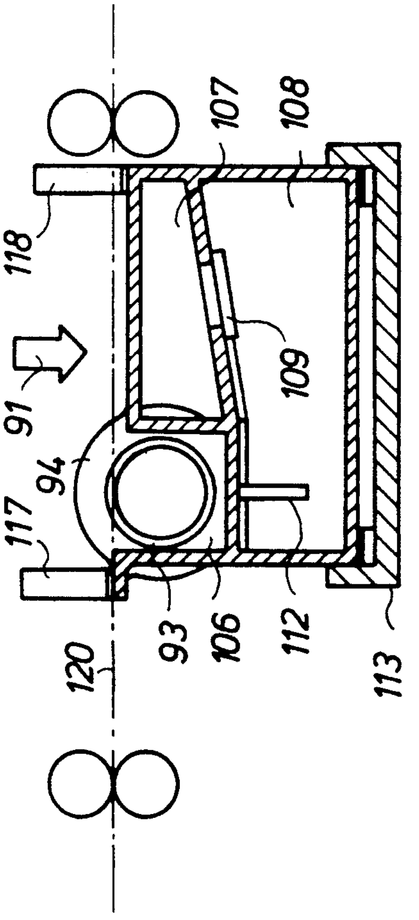
FIG. 10 is a transverse sectional view on line 10-10' of FIG. 9.

The tray has in its bottom wall a section 110 FIG. 9 of reduced strength, by the provision of a circular groove 111. The section 110 has a fin 112 which may co-operate with detent means that belongs to the apparatus, in order to rupture the weakened section 110 upon removal of the cassette from the apparatus as described hereinbefore for the first embodiment of the invention.

The holder space 107 for developing liquid has in fact an L-like shape in plan view, as appears from FIG. 8, and the innerside face of the small leg of the L has wall means through which a fluid connection between the holder and the tray 106 may be established. In the present embodiment, said means is in the form of a section of reduced strength, with the size of a coin as illustrated by the numeral 103 in FIG. 9, which may have been obtained by the moulding of a circular groove as described hereinbefore with reference to the wall section 110 and is ruptured by the free end of lock roller 93.

The base plate 113 of the apparatus has compression springs 114 and 115 that urge the processing cassette upwardly so that its upper peripheral edge abuts against positioning fingers such as 116, 117 in FIG. 9 and 117, 118 in FIG. 10, which thereby ensure an accurate vertical position of the lick roller 93 with respect to the plane 120 wherein a film sheet 121 travels and which is approximately 0.5 mm below the top of the lick roller. For the sake of clarity, there has been drawn a slight spacing between the fingers 116, 117 and 118 and the cassette in FIG. 10, but it is clear that said space is zero in practice.

The processing cassette has at its end opposite to the liquid inlet side, an end seal 94 as mentioned already hereinbefore. Said seal is formed by a cylindrical wall portion of the cassette with a bore 124 into which a very flexible sealing ring 122 and a flexible scraper ring 123 are provided see also the view of FIG. 11 which illustrates the relative portions of the cassette and the lick roller, just prior to the engagement of the roller by the cassette.

The ring 122 is made of very flexible rubber, and tapers towards a circular opening with a diameter that is approximately Δrd of the diameter of the lick roller.

The ring 123 is made of a tough, flexible rubberlike material with an inner opening which may be approximately 20% less than the diameter of the lick roller. It has been found that a foamed synthetic rubber (such as NEOPRENE, registered Tradename) with a thickness of 2 to 3 mm, and covered with a layer of synthetic fabrict e.g. made from NYLON, registered Tradename, as used for surfing and diving suits, yielded excellent results for the construction of this ring.

As the cassette is pushed over the lick roller, the pointed tip of the free end of the lickroller easily penetrates through the sealing ring 122 so that the opening thereof progressively increases, and the ring is finally applied against the roller in an almost cylindrical configuration as shown in FIG. 9. The ring 123 is less deformed and takes a shape as also illustrated in FIG. 9.

The ring 122 ensures an effective liquid seal between the lick roller and the tray 106, and thereby any leakage of developer liquid is prevented as the lick roller ruptures the wall section 103, and the tray becomes filled with liquid up to a level as indicated approximately by the broken line 125.

In use of the processing cassette, the level of the developer liquid gradually lowers as liquid is taken up by the developed film sheets. Such lowering level has no detrimental effect on the quality of processing, as long as the lick roller is kept uniformly wetted.

The replacement of a used developing cassette occurs as follows. The operator slides the cassette outwardly through the leftside opening 104 of the apparatus and causes thereby the rupturing of the weakened wall section 110 by the retaining of the fin 112 by detent means, not illustrated, so that the fin is caused to rock and to break thereby the section 110, in a way similar as described hereinbefore for the cassette illustrated in FIG. 3.

The liquid remaining in the tray 106 and the space 107 quickly flows into the space 108 where it becomes absorbed by absorbent pad means, not illustrated.

Withdrawal of the cassette causes the seal 122 to slide over the roller whereby all the liquid that adheres to the roller is thoroughly removed. Small solid deposits and the like that might occasionally have been formed on the roller, are removed by the seal 123 which operates as a scraper because of its stiffer configuration.

In case the removal of solid deposits and the like would yet not have been carried out in a perfect way by the seal 123 of a used cassette the unused and thus stronger seal 123 of a fresh cassette which is next introduced over the roller, operates additionally to remove such deposits.

The separate fixing cassette 92 operates in the same way as the fixing section of the cassette 35 shown in FIG. 2, and for that reason the same components are indicated by the same numerals.

The main advantage of the separate processing cassettes illustrated in FIGS. 8 to 11, is that the developer liquid may be replaced, if prematurely exhausted, without having to replace simultaneously the roll of receptor web in the fixing section and vice versa.

The premature exhaustion of the developing liquid, such as by oxidation to the air of conventional developer or by the absorption of $CO_2$ from the air by an alkaline activator solution, can occur with low volume users who process a few film sheets only per week, and who thereby will not have used the full capacity of the fixing section as the developer section has become unusable already.

It will be understood that also a developing cassette as shown in FIGS. 8 to 11 may be provided with measures for limiting the contact of the processing liquid with the environment air. In a suitable embodiment, the apparatus itself may be provided with hood means for covering the open tray. Since in such case the top closure makes part of the apparatus and not of the cassette as illustrated hereinbefore with reference to FIGS. 1 to 5, more freedom is left for the choice of a suitable material for the top closure. It has been shown that it is advantages to make the top closure from a relatively weak and resilient material such as rubber or the like. In this way, the top closure may seal the developing tray almost hermetically , and there is no need for delicate co-operating groove and tongue closures as described in the first embodiment.

The possibility may be envisaged of providing the receptor web as a roll that is much larger than the one required for the fixing of a number of sheets that can be processed with one developing cassette.

Figure 12:
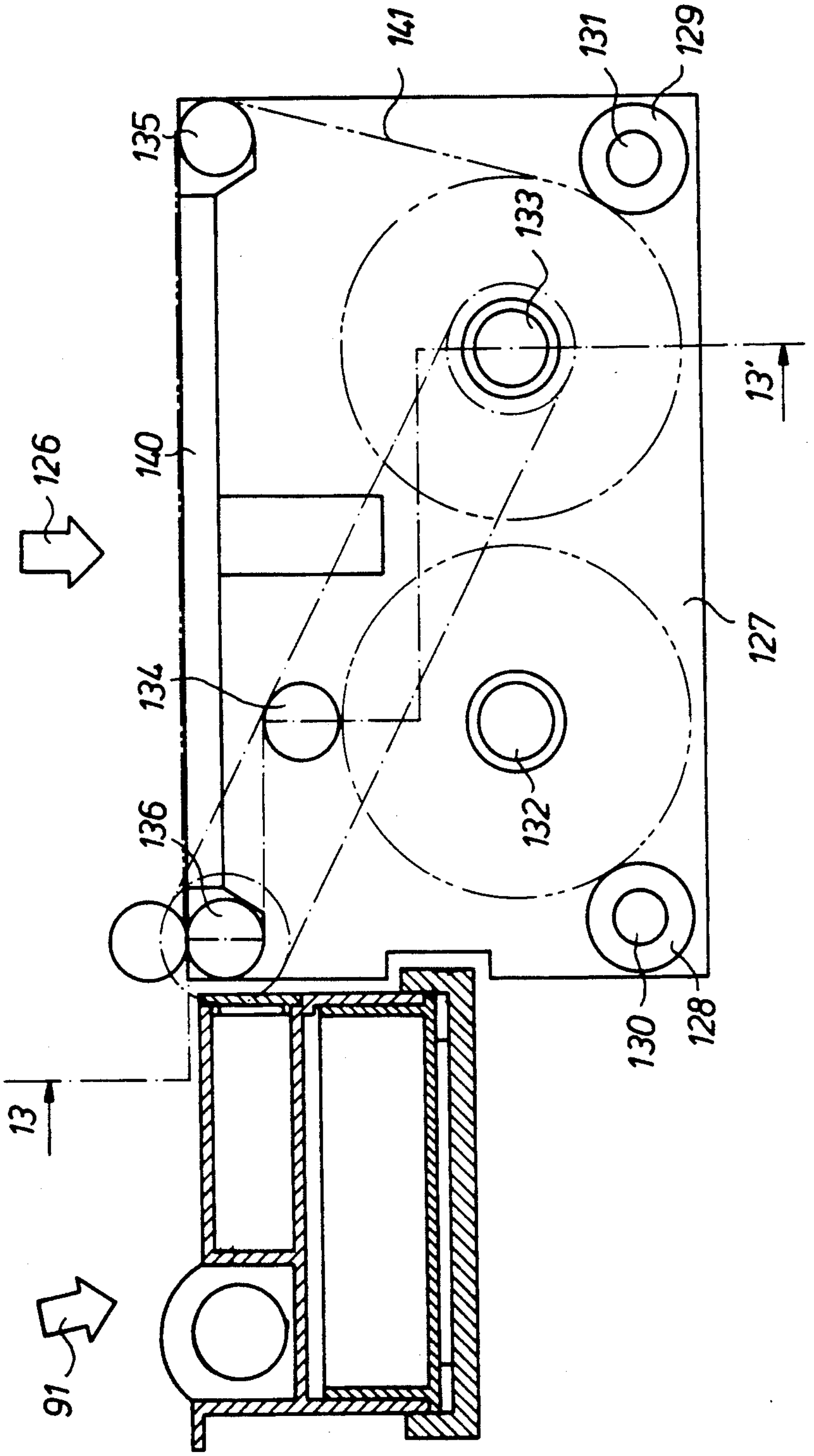
FIG. 12 is a diagrammatic illustration of a web loading arrangement for use with a processing cassette according to the invention.
Figure 13:
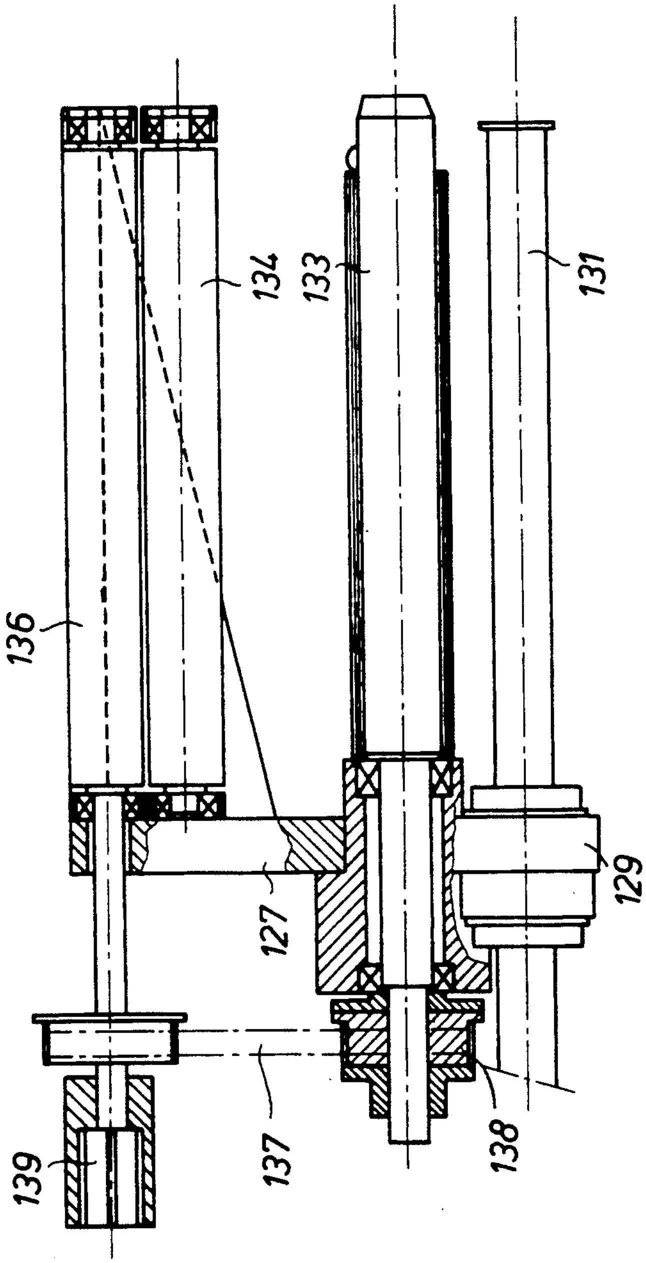
FIG. 13 is a sectional view on line 13-13' of FIG. 12.

A fixing station 126 for embodying this concept, is illustrated in FIGS. 12 and 13. The fixing station is not in the form of a cassette in this embodiment, but instead thereof a vertical frame 127 is mounted for sliding displacement by means of slide bearings 128, 129 on horizontal, fixed rods 130, 131.

The frame 127 rotatably bears an unwinding spindle 132, a winding spindle 133, idler rollers 134 and 135, and a drivable roller 136. The roller 136 has a coupling sleeve 139 for entering in driving engagement with a driving shaft of the apparatus as the frame is pushed entirely in the apparatus. A belt 137 transmits the rotation of the roller 136 to a slip clutch 138 on the shaft of the winding spindle 133. The arrangement finally has a horizontal platform 140 along which the receptor web is pulled.

The described mechanism has the advantage that it may be pulled clear of the imaging apparatus, whereby the unwinding and winding spindles are readily accessible for the operator to remove the used roll of receptor web and to insert a fresh roll.

We claim:

1. Photographic image-forming apparatus which comprises an exposure station for the imagewise exposure of a photographic silver halide emulsion layer element, a developing station wherein a silver halide developer liquid is applied to said imagewise exposed element, and a fixing station wherein a silver halide fixing agent is applied to the imagewise exposed element, and driving means for transporting said element through the stations in sequence, wherein at least said developing station is incorporated into a processing cassette that contains developer liquid and removably fits into said apparatus, said cassette houses absorption means effective for absorbing unused developer liquid brought into contact therewith, and said apparatus comprises means operable in association with the processing cassette for bringing unused developer liquid in said cassette into contact with said absorption means when the cassette is removed from the apparatus.

2. Photographic image-forming apparatus which comprises an exposure station for the imagewise exposure of a photographic silver halide emulsion layer element, and a processing station for the photographic processing of the exposed element, which apparatus is arranged to receive a replaceable cassette which contains at least one photographic processing liquid, wherein the cassette (91) has a holder (107) for a supply of developer liquid, and an initially empty applicator tray (106) arranged for cooperation with an applicator lick roller disposed therein, said apparatus includes said lick roller supported on a fixed axis in cantilevered relation by a journal (97, 98) at one end only, and a normally closed fluid connection separates said holder and tray, the opposite free end (102) of the lick roller being disposed to open said fluid connection between the holder and the tray to transfer developer liquid from the holder to the tray when the cassette is introduced into the apparatus.

3. Photographic image-forming apparatus according to claim 2, wherein said normally closed fluid connection is a rupturable well section between said holder and tray and the free end (102) of said lick roller is arranged to rupture said wall section when the cassette is introduced into the apparatus.

4. Photographic image-forming apparatus according to claim 2, which further comprises top closure means for airtightly sealing the applicator tray and the applicator lick roller disposed therein during the periods of non-use of the apparatus.

5. Photographic image-forming apparatus according to claim 1, which further comprises spindle means (132, 133) for the unwinding and winding of a receptor web (141) to be brought in contact with an exposed and developed photographic element, said spindle means being arranged for at least partial withdrawal from the apparatus in order to facilitate the replacement of a used roll of receptor web with a fresh one.

6. Photographic apparatus according to claim 1, which is adapted for the reproduction of documents into microfiches, and wherein dispensing means is provided for dispensing microfiches form a supply thereof in succession to the exposure station for imagewise exposure thereof in correspondence to said documents.

* * * * *